United States Patent
Hathaway et al.

[11] Patent Number: 5,995,887
[45] Date of Patent: Nov. 30, 1999

[54] APPARATUS AND METHOD FOR DETERMINING A FAILURE OF AN AUTOMATIC TRANSMISSION FLUID TEMPERATURE SENSOR

[75] Inventors: Richard Reynolds Hathaway, Canton; Earl Roslin Hoffman; Bruce John Palansky, both of Livonia; Philip Joseph Wiethe, Redford; Kenneth Paul Wozniak, Chelsea, all of Mich.

[73] Assignee: Ford Global Technologies, Inc., Dearborn, Mich.

[21] Appl. No.: 08/944,502

[22] Filed: Oct. 6, 1997

[51] Int. Cl.⁶ .............. G01M 19/00; G06F 19/00
[52] U.S. Cl. .............. 701/34; 701/63; 73/118.1; 340/449
[58] Field of Search ............... 701/29, 34, 62, 701/63; 73/118.1, 766; 340/449, 588, 589

[56] References Cited

U.S. PATENT DOCUMENTS

| | | | |
|---|---|---|---|
| 4,949,078 | 8/1990 | Ito et al. | 701/34 |
| 5,107,246 | 4/1992 | Mogaki | 701/34 |
| 5,291,803 | 3/1994 | Yamaguchi | 74/866 |
| 5,319,963 | 6/1994 | Benford | 73/118.1 |
| 5,566,092 | 10/1996 | Wang et al. | 364/131 |
| 5,614,664 | 3/1997 | Yamagishi | 73/117.3 |
| 5,646,341 | 7/1997 | Schricker et al. | 73/117.3 |
| 5,848,381 | 12/1998 | Ishii et al. | 701/34 |

*Primary Examiner*—Gary Chin
*Attorney, Agent, or Firm*—James J. Dottavio

[57] ABSTRACT

A method and apparatus are provided to determine a failure of an automatic transmission temperature sensor in an automobile. The apparatus detects a start-up of the vehicle. A sensor detects the transmission fluid temperature. The transmission fluid temperature at start-up is checked to see if the temperature is below a first predetermined temperature or above a second predetermined temperature. If the sensor does not detect a predetermined change in temperature during operation of the vehicle after it is determined the transmission fluid temperature at start-up is above the first predetermined or below the second predetermined temperature, the sensor has failed.

10 Claims, 2 Drawing Sheets

APPARATUS AND METHOD FOR DETERMINING A FAILURE OF AN AUTOMATIC TRANSMISSION FLUID TEMPERATURE SENSOR

BACKGROUND OF THE INVENTION

1. Field of the Invention

The present invention relates to an apparatus and method for determining the failure of an automatic transmission temperature sensor.

2. Discussion of the Prior Art

A transmission fluid temperature sensor (TFT) is used to detect a temperature of the transmission fluid. California Air Resources Board (CARB) has forced implementation of an "In-range TFT" diagnostic test to detect a TFT failure, because TFT is used as an entry condition for some transmission diagnostic monitors. CARB determined that TFT sensor may indirectly impact vehicle emissions and therefore requires this test.

Most prior art TFT diagnostic only detect open and short circuit faults. An improved test is described in U.S. Pat. No. 5,107,246 to Mogaki ('246 patent). The test described in the '246 patent includes measuring the temperature of the engine coolant and the transmission fluid. The test of the '246 patent then determines whether the transmission fluid temperature is within a predetermined range. But when the engine coolant temperature is above a particular value or below a second value, the transmission temperature sensor is not tested.

The test described in the '246 patent may still provide a false error detection if the engine coolant temperature sensor is working and the transmission fluid temperature sensor provides an erroneous signal within a predetermined range, or if the engine temperature sensor provides an erroneous signal within a predetermined range.

It would therefore be desirable to provide a test which determines more accurately proper operation of a transmission fluid temperature sensor.

SUMMARY OF THE INVENTION

It is thus a general object of the present invention to provide a method and apparatus for more accurately determining proper operation of a transmission fluid temperature sensor.

In carrying out the above object and other objects, features, and advantages of the present invention, a method and apparatus are provided to determine a failure of an automatic transmission temperature sensor in an automobile. The apparatus detects a start-up of the vehicle. A sensor detects the transmission fluid temperature. The transmission fluid temperature at start-up is checked to see if the temperature is below a first predetermined temperature or above a second predetermined temperature. If the sensor does not detect a predetermined change in temperature during operation of the vehicle after it is determined the transmission fluid temperature at start-up is above the first predetermined or below the second predetermined temperature, the sensor has failed.

DETAILED DESCRIPTION OF A PREFERRED EMBODIMENT

Figure 1:
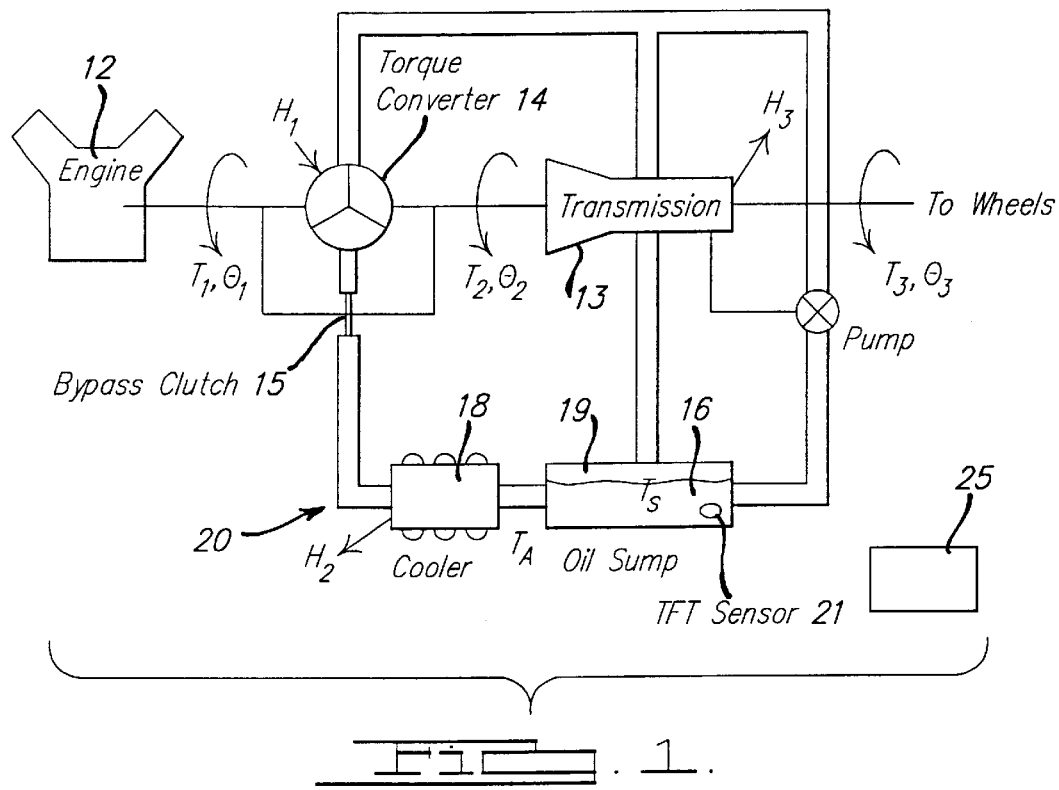
FIG. 1 is a schematic representation of an engine and a transmission cooling circuit according to the present invention.

As shown in FIG. 1, in a motor vehicle (not shown), an engine 12 is driveably connected to a transmission 13 through a torque converter 14. A torque converter 14 includes a bypass, or lockup, clutch 15. When the bypass clutch 15 is engaged, no substantial heat is generated by the torque converter 14, because the clutch 15 transmits torque from the engine 12 to the transmission 13. However, when the bypass clutch 15 is open, the torque converter 14 operates to multiply torque. When doing so, the torque converter 14 produces heat. The heat from the torque converter 14 is transferred to the transmission fluid 16 increasing the temperature thereof. The fluid 16 also circulates through the transmission 13 which also generates heat due to friction. The heat generated by the transmission 13 is also transferred to the fluid 16. The fluid 16 is collected in a reservoir, or sump 19, which is provided to hold an adequate amount of fluid 16. The fluid 16 flows through a transmission cooler 18. The cooler 18 is provided to reject heat and reduce the temperature of the fluid 16. A transmission Temperature (TFT) Sensor 21 detects the temperature of the fluid 16. In a preferred embodiment, the TFT sensor 21 is provided in the reservoir 19.

While the vehicle is driven, the temperature of the fluid 16 is normally elevated. After the vehicle is shut off and the hot fluid 16 is exposed to ambient temperature, the fluid temperature approaches ambient. An extended exposure to ambient temperatures is commonly referred to as a "cold soak".

During operation of the vehicle, the torque converter 14 and transmission 13 generate heat, so the temperature of the fluid 16 in the oil sump 19 increases as described above. During such operation, the TFT sensor 21 would detect an increase in the temperature of the fluid 16, provided the sensor 21 is functioning properly.

When the vehicle has not remained in an idle state for an adequate period to enable the fluid 16 to cool to ambient temperature, or a "hot start", the fluid 16 temperature remains higher than the ambient air temperature. In such a situation, if the transmission 13 is not engaged, the temperature of the fluid 16 may decrease, as the cooler 18 continues to reject heat. Likewise, if the converter bypass clutch 15 is locked, the converter 14 will generate little heat and the temperature of the fluid 16 may decrease. Therefore the sensor 21 may detect a decrease in temperature within the oil sump 19 after a hot start.

Figure 2:
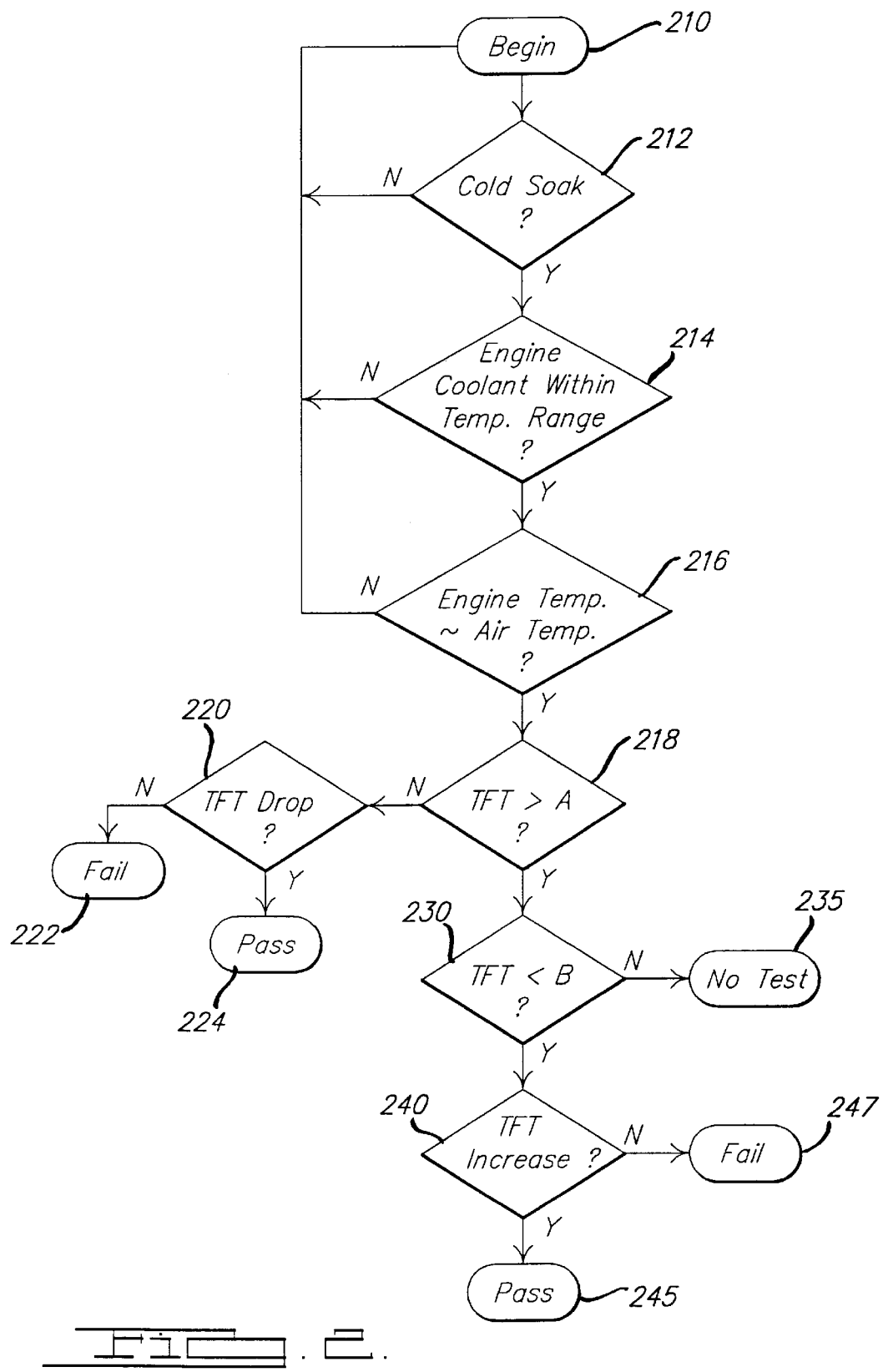
FIG. 2 is a flow chart for a transmission fluid temperature sensor test according to the present invention.

As illustrated in FIG. 2, after the vehicle is started 210, the computer 25 determines whether a cold soak has occurred 212. In a preferred embodiment, the computer 25 evaluates the amount of time a powertrain control module (not shown) is "off". Upon determination that the powertrain control module has been off for a predetermined period of time, it is assumed that the system is in thermal equilibrium. In a preferred embodiment, an adequate power-off time is determined by calculating a heat transfer for a known quantity of fluid at a temperature measured by the TFT sensor at a measured ambient temperature and a safety factor is added thereto. Alternatively, a conservative time, such as 6 hours may be selected to establish a cold soak. In a preferred embodiment the test is run only after a cold soak.

In an alternative embodiment, the test may be run if the temperature of the fluid 16 is within a predetermined range at a given ambient temperature, such that the thermal equilibrium of the fluid 16 will change after the vehicle is run.

In a preferred embodiment, the engine coolant temperature is then measured 214. The temperature must be within a predetermined range, in a preferred embodiment 40–100° F. Applicants have discovered that if the ambient temperature is extremely cool the transmission temperature may not increase for an unacceptably long time. The transmission temperature stabilizes at normal operating temperatures and changes very little thereafter.

In a preferred embodiment, the air inlet temperature is measured and must be close to the engine coolant temperature 216. By making this determination, the present invention is able to verify that the vehicle temperature is approximately the same as the ambient temperature. Therefore Applicants are able to determine that a cold start actually has occurred. In a preferred embodiment, a difference of less than ten degrees F. is considered as a cold start.

In an alternative embodiment, instead of measuring coolant temperature and comparing to the ambient, the ambient temperature is compared to the TCC sensor measurement to determine if the temperature of the transmission fluid 16 is substantially the same as ambient, and therefore a cold start has occurred. This test may alternatively be used to detect a cold start if the coolant temperature sensor has failed.

Figure 3:
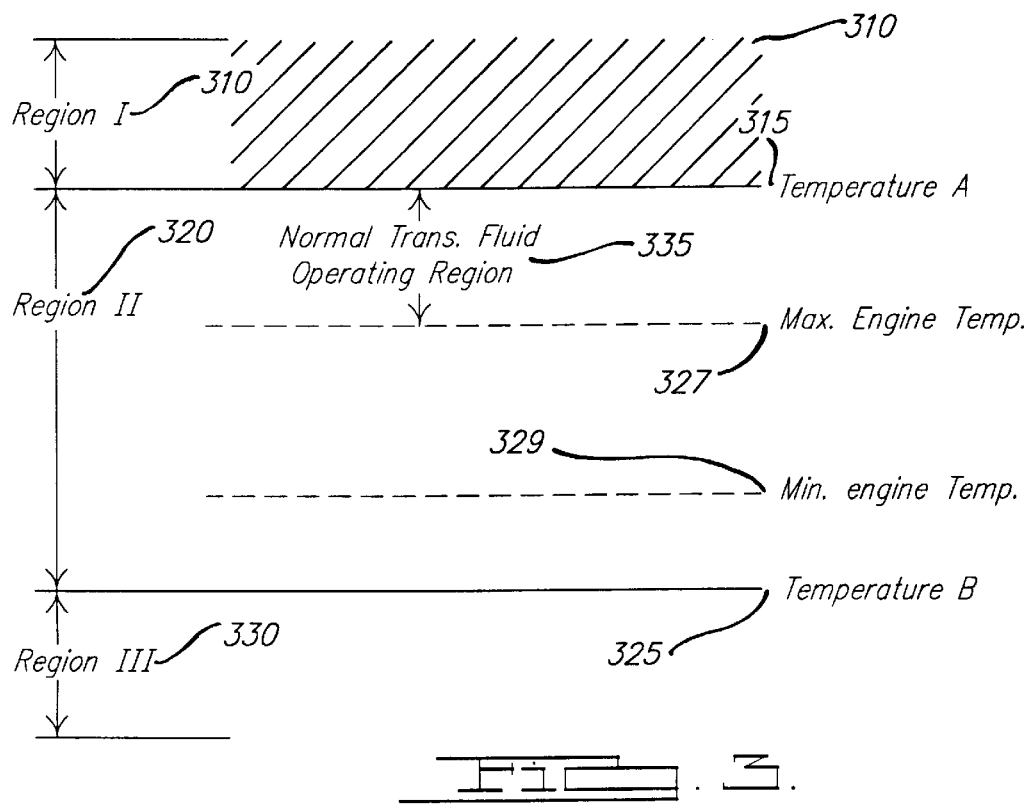
FIG. 3 illustrates the normal operating temperature ranges for engine and transmission coolants.

As illustrated in FIG. 3, the present test envisions three temperature operating Regions, 310, 320, 330. Region I 310 exists above a first temperature A 315. Above temperature A 315, the transmission fluid temperature is above the normal transmission fluid operating region 335, within Region II 320. In a preferred embodiment when the transmission fluid temperature is above temperature A 315, then during operation of the vehicle the TFT must drop below temperature A 315, or drop a sufficient amount, otherwise it may be assumed that the TFT has failed in range, above temperature A 315. Temperature A is dependent upon the particular application, preferably approximately 200–240 degrees F. Above this temperature, it may be necessary to disable portions of OBD-II to ensure proper function. IN a preferred embodiment, a sufficient drop in temperature is approximately ten degrees F. to ensure the sensor detects an adequate temperature change.

Region II 320 includes the normal transmission fluid operating temperature region 335 and the normal temperature operating region for the engine, between a maximum temperature 327 and a minimum temperature 329. The normal transmission fluid operating region 335 is preferably above the maximum engine temperature 327.

When the TFT begins in Region II 320, the TFT is preferably not tested. The rational behind this is that TFT maybe functioning within this range and not encounter a significant temperature change during operation of the vehicle. However when a reading is encountered in the second region 320, all other transmission diagnostics are enabled. In an alternative embodiment, the TFT sensor may be tested in this region to determine if it is functioning by detecting an adequate temperature change during operation, but the test should not determine a failure if the sensor does not detect an adequate change in temperature, preferably ten degrees F.

A third Region 333 is provided below a temperature B 325. When the TFT begins in the Region III 330, the TFT must rise by a calibratable amount or rise from Region III 330 to a value above temperature B 325, before the test is complete. In a preferred embodiment, temperature B is approximately 40–60 degrees F., below which some OBD-II tests may required to be disabled to ensure accuracy.

In Region III 330, the TFT will pass the test if the TFT sensor indicates a temperature change sufficient to satisfy the expected change in the sump temperature from the heat model as described below. In a preferred embodiment, the requisite sensed rise in temperature (within Region III) is five degrees F. for the sensor to pass the test.

The TFT sensor will fail the test if the vehicle is operated for such a length of time and in such a drive mode that one would expect the TFT to change. The conditions include the engine coolant temperature rising toward a normal operating temperature, the transmission is in gear, the vehicle power is on, and the vehicle is moving. The sensor temperature will not change after a calibratable time if the sensor is defective. In a preferred embodiment, if the vehicle operates in Region I 310 or Region III 330 for ten minutes without detecting an adequate change in temperature, the test may consider the sensor to have failed. Preferably this includes ensuring the transmission is in gear and the vehicle is moving during the timed period.

The heat model used for the analysis in the present invention includes the equation shown below. These are a simplification of the thermal conditions experienced by the transmission fluid. Conservation of energy require the heat flow when the torque and rotation speed of the engine is not equal to the torque and speed of the output from the torque converter, i.e. when the lockup clutch is not engaged. The heat flow from the transmission cooler is derived from the temperature difference between the sump temperature and the ambient temperature multiplied by a constant which is defined by the transmission cooler characteristics. Heat flow in the transmission is also defined by conservation of energy, and may be established by comparing the input torque and rotational speed to the output torque and rotational speed. Due to frictional and other losses in the transmission, heat flows into the transmission fluid. The heat transfer may be defined as follows.

$$\Delta q = mc\Delta t_s$$

Where m is the mass of the oil, c is the specific heat of the oil, $\Delta T_s$ is the change of temperature in the oil sump and $\Delta q$ is the heat flow. For a given time "t", the heat flow may be defined as follows.

$$\Delta q = t(h1-h2+h3)$$

Where h1 is the heat flow into the oil at the torque converter, h2 is the heat expelled from the cooler, and h3 is the heat introduced by the transmission losses.

It is to be understood that the embodiments of the invention described above are merely illustrative of application of the principals of the present invention. Numerous modifications may be made to the methods and apparatus described above without departing from the true spirit and scope of the invention.

What is claimed is:

1. An apparatus for determining a failure of an automatic transmission temperature sensor in a vehicle, the apparatus comprising:

means for detecting a start-up of the vehicle;

a sensor for detecting a transmission fluid temperature;

means for prohibiting a failure determination for the automatic transmission fluid temperature sensor when the transmission fluid temperature at the start-up is below a first predetermined temperature or above a second predetermined temperature that is below the first predetermined temperature; and sensor test means for determining that the sensor has failed when the sensor does not detect a predetermined change in temperature during operation of the vehicle after it is determined that the transmission fluid temperature at the start-up is above the first predetermined temperature or below the second predetermined temperature.

2. An apparatus according to claim 1 wherein said sensor test means further determines that the transmission fluid temperature sensor is functioning when the sensor detects a predetermined change in fluid temperature after the start-up when the transmission fluid temperature at the start-up is below the first predetermined temperature and above the second predetermined temperature.

3. An apparatus according to claim 1 wherein the means for detecting the start-up comprises:

a means for detecting a cold start-up, comprising:
means for measuring vehicle coolant temperature and determining whether the coolant temperature is within a predetermined range;
means for measuring air temperature, and
means for determining whether the coolant temperature is substantially equivalent to the air temperature.

4. An apparatus according to claim 3 wherein the sensor test means determines that the transmission fluid temperature sensor is functioning properly when the transmission fluid temperature at the startup is above the first predetermined temperature and after the startup is measured at a level below the first predetermined temperature.

5. An apparatus according to claim 3 wherein the sensor test means determines that the transmission fluid temperature sensor is functioning properly when the transmission fluid temperature is measured at the startup below the second predetermined temperature and after the startup is measured at a level above the second predetermined temperature.

6. The apparatus according to claim 1 wherein the means for detecting the start-up comprises;

a means for detecting a cold start-up comprising:
means for measuring air temperature, and
means for comparing the transmission fluid temperature to the air temperature, wherein said cold startup is detected when the fluid temperature is substantially the same as the air temperature.

7. A method for determining a failure to automatic transmission fluid temperature sensor for a vehicle comprising the steps of:

determining that the vehicle experiences a start-up;

sensing a first transmission fluid temperature at the start-up;

sensing a second transmission fluid temperature after the vehicle has operated for a predetermined amount of time;

prohibiting a failure determination of the transmission fluid temperature sensor when the first transmission fluid temperature is below a first predetermined temperature or above a second predetermined temperature that is above the first predetermined temperature; and determining whether a magnitude of the difference between the first and second transmission fluid temperatures is greater than a predetermined amount, otherwise determining that the automatic transmission fluid temperature sensor has failed.

8. The method according to claim 7 further comprising the step of determining the startup was a cold start-up.

9. The method according to claim 8, wherein the step of determining the cold start-up comprises the steps of:

measuring air temperature, and comparing the transmission fluid temperature to the air temperature, wherein the cold startup is detected when the fluid temperature is substantially the same as the air temperature.

10. A method according to claim 7 further comprising the steps of:

determining the first transmission fluid temperature is not below the first predetermined level and not above the second predetermined level; and determining the magnitude of the difference between the first and second transmission fluid temperatures is greater than a predetermined amount, and thereafter determining the sensor is functional.

* * * * *